Dec. 11, 1934. C. H. ELLIOTT ET AL Re. 19,392

SWITCH ACTUATING MECHANISM

Original Filed Aug. 9, 1929 2 Sheets-Sheet 1

Inventors
Charles H. Elliott
Harold K. Elliott
By Howard Ricker
Attorney

Dec. 11, 1934. C. H. ELLIOTT ET AL Re. 19,392

SWITCH ACTUATING MECHANISM

Original Filed Aug. 9, 1929 2 Sheets-Sheet 2

Inventors
Charles H. Elliott
Harold K. Elliott
By Howard Richey
Attorney

Reissued Dec. 11, 1934 Re. 19,392

UNITED STATES PATENT OFFICE 19,392

SWITCH ACTUATING MECHANISM

Charles H. Elliott and Harold K. Elliott,
St. Paul, Minn.

Original No. 1,866,594, dated July 12, 1932, Serial No. 384,686, August 9, 1929. Application for reissue September 21, 1932, Serial No. 634,204

8 Claims. (Cl. 200—106)

The present invention relates to a switch actuating mechanism, and more particularly to an actuating mechanism for a switch of the general type shown in Patent No. 1,596,007, of Harold K. Elliott, issued August 17, 1926.

An object of the present invention is to make a simple and positive electrically actuated control switch.

In order to attain this object, there is provided, in accordance with one feature of the invention, a switch having a plurality of spring contact members mounted on a base plate and having a contact plate mounted for vertical movement immediately above said contact points. An electrically releasable spring controlled actuating mechanism is mounted above said plate, and is normally held in a locked position in upwardly spaced relation from said plate, maintaining the circuits controlled thereby normally open. Electrically actuated release means are mounted to release said locking mechanism to actuate said switch to depress said plate and to bring said plate into contact with said spring contact members, to automatically close the circuits controlled by said actuating mechanism.

These and other features of the invention will be more fully brought out in the following description and the accompanying drawings, wherein.

Figure 1:
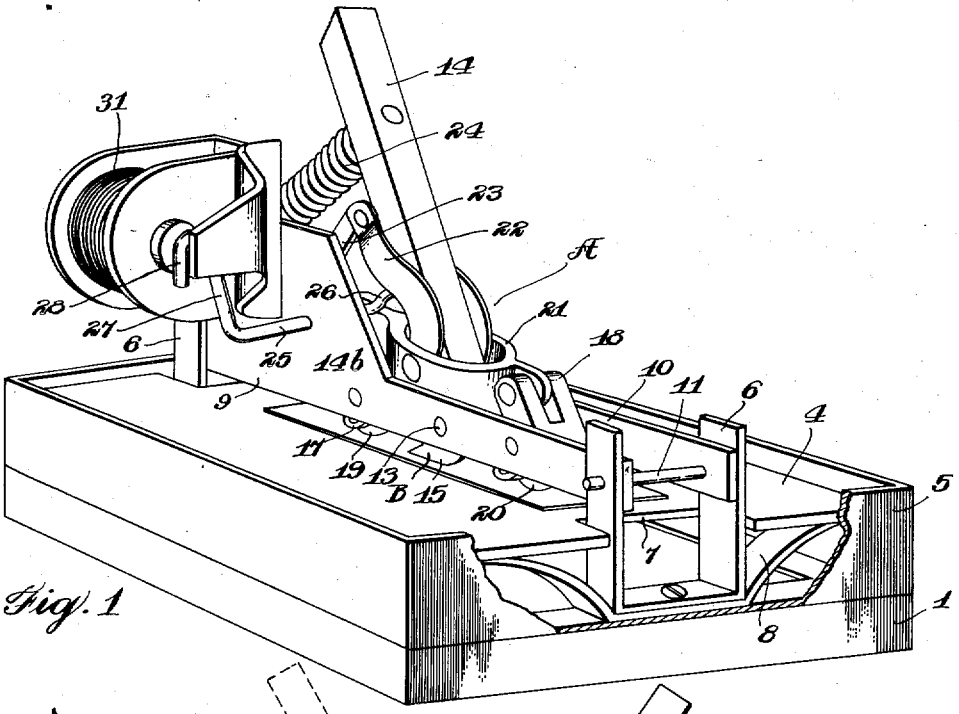
Figure 1 is a view in perspective of a switch made in accordance with the present invention.

Referring to the drawings in detail, the master switch A has a base 1 of insulative material and has secured to the upper surface thereof, a plurality of spring contact members 2, said contact members being preferably of spring leaf bronze. The upper ends of said members 2 curve outwardly to engage contact plates 3 mounted on the lower surface of a slidable plate 4 of insulative material. An enclosure 5 is mounted on the upper surface of the base 1 and encloses the slidable plate 4 on the sides thereof, there being sufficient clearance between the edges of the plate 4 and the enclosure to permit free slidable movement of the plate. A pair of U-shaped support members 6 are mounted at each end of the base 1 to project upwardly from the upper surface thereof, said members being positioned within the enclosure 5. The slidable plate 4 is cut away as at 7 to receive these members. Between the U-shaped support members 6 and the base are mounted a pair of leaf springs 8 which are preferably of bronze. These springs exert an upward pressure on the slidable plate 4 to normally hold it in raised position free of the contact members 2, maintaining the circuits controlled by the master switch A normally open.

Mounted longitudinally of the device and supported by the U-shaped supporting members 6 are a pair of frame support members 9 and 10 which are connected to the U-shaped support members as by means of pins 11 and 12. Pivotally mounted upon a pin 13 positioned transversely between the two frame members 9 and 10 is an operating lever 14. A plate retaining latch B is pivoted independently of the handle 14 upon the same pin 13 which supports the handle. This plate retaining latch comprises a metal member having a pair of side portions 15 and a transverse portion 16 positioned to be engaged by the square lower edge portion 14*a* of the handle 14, see Figure 2, when said handle is moved to the dotted line position shown in Figure 2 to trip the plate retaining latch and release the plate 4 to move upwardly under the impulse of the springs 8.

Figure 6:
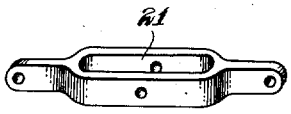
Figure 6 is a view in perspective of a yoke which connects two of the switch operating elements.
Figure 7:
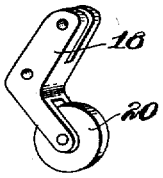
Figure 7 is a view in perspective of a lever having a roller mounted therein.

Also mounted pivotally between the two members 9 and 10 are a pair of lever arms 17 and 18. One of these lever arms is shown in detail in Figure 7. Mounted in the lower end of each of said lever arms for free pivotal movement therein, are rollers 19 and 20 which are adapted to roll upon the upper surface of the slidable plate 4 to reduce friction in the operation of the device. A yoke 21, shown in detail in Figure 6, connects the upper end of the levers 17 and 18, said yoke being also pivotally connected to the handle 14 by a pivot pin 14*b*. Also pivotally connected to the handle 14 by the pin 14b is a link 22 which forms part of a toggle joint connecting the handle to the members 9 and 10. A second link 23 is pivotally connected to the link 22 and also to the frame members 9 and 10 to complete the toggle joint. When the operating handle is in the set position shown in dotted lines in Figure 2, the toggle joint formed by the links 22 and 23 is in a straight line which locks the operating handle 14 against rearward or clockwise movement as shown in dotted lines in Figure 2.

Figure 2:
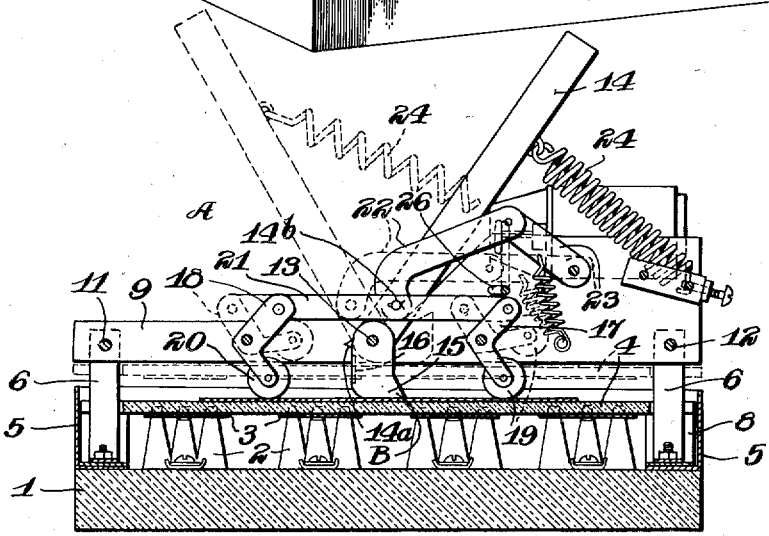
Figure 2 is a vertical longitudinal sectional view through the device shown in Figure 1.
Figure 5:
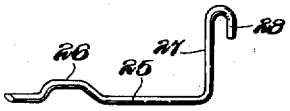
Figure 5 is a view in perspective of a locking release member.
Figure 10:
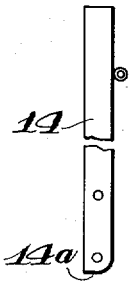
Figure 10 is a view in side elevation of an operating handle with a portion of the center thereof broken away to increase the scale of the drawings.
Figure 9:
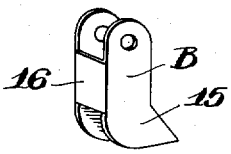
Figure 9 is a view in perspective of a plate support member.

A coil spring 24 is connected to the handle 14 and to the supporting frame to normally urge said handle to the solid line position shown in Figure 2. A releasing lever 25, shown in detail in Figure 5, is pivotally mounted transversely of the frame members 9 and 10 and provided with an offset portion 26 therein located beneath the toggle joint composed of the links 22 and 23. The release lever 25 has a vertically positioned portion 27 with a loop 28 therein which is positioned over a rod 29 connected to the core 30 of the solenoid 31. The rod 29 is provided with a head 32 which rests against the looped portion 28 of the release lever. The normal positions of these parts are shown in solid lines in Figure 3 and the operated positions are shown in dotted lines in said figure.

Figure 8:
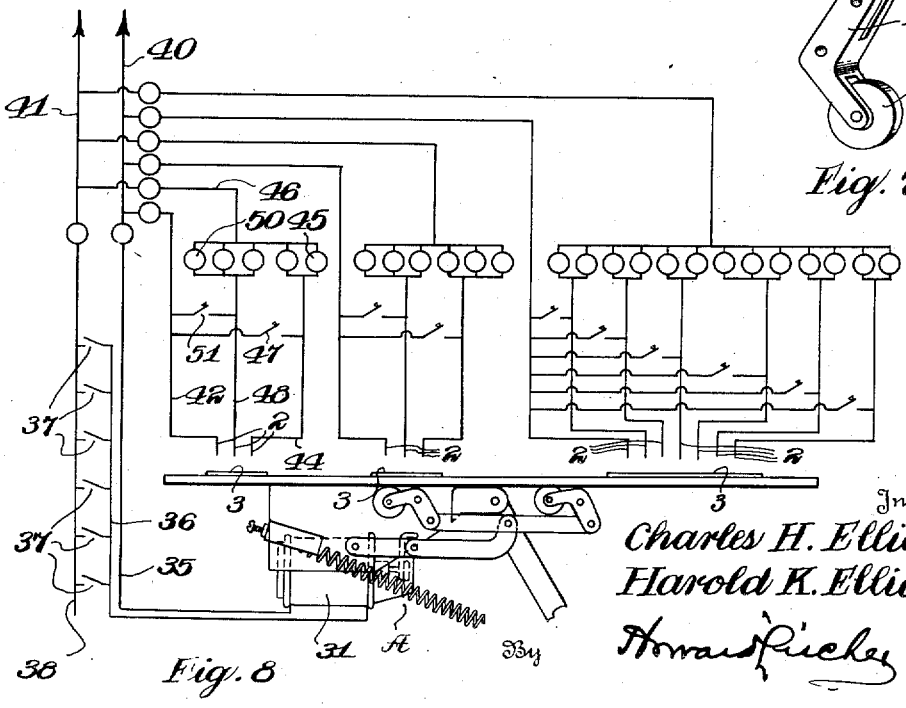
Figure 8 is a diagrammatic view of lighting circuits in which the present device is incorporated, illustrating diagrammatically the master switch and actuating circuit.

The operating circuit for the solenoid is shown in Figure 8. In this circuit a conductor 35 is connected to one side of a line bearing a suitable supply of electrical energy, said conductor being also connected to one side of the coil 31 of the solenoid. From the other side of the coil a conductor 36 is connected to the self-restoring switches 37 and from these switches a conductor 38 leads to the other side of the line, as illustrated in Figure 8.

The light circuits are controlled as shown diagrammatically in Figure 8. The two sides of a line are illustrated as 40 and 41. Three main light circuits are shown in this diagram, but, since they are all substantially identical except for the number of lights therein, but one of these circuits will be described in detail.

From one side of the line a conductor 42 is connected to one of the terminals 2 of the control master switch A comprising a part of the present invention. From a second contact point of said switch a conductor 44 is connected to a plurality of lamps, or other electrical devices 45 in parallel. From the other side of these lamps or electrical devices, a conductor 46 is connected to the other side of the line. Across the conductors 42 and 44 is connected a switch 47 by means of which the lamps or devices 45 may be controlled when the control master switch A is open. A third conductor 48 is also connected to a contact point 2 in the switch A and is connected to the other lamps or electrical devices 50. The points 2 in the diagrammatic illustration in Figure 8 are the same as the spring fingers 2 in the master control switch A. The other side of these lamps or electric devices 50 is connected to the conductor 46 and thus to the other side of the line 41. A switch 51 is also connected across the circuit of these additional lamps or electrical devices to independently control them when the control master switch A is open. When the control switch A is closed, it will complete a circuit through the lamps or electrical devices 45 and 50, as well as in the other circuits illustrated diagrammatically in Figure 8, and each of the circuits is provided with the same control switches such as 47 and 51 which control individually the electric lamps or devices connected to the switches as illustrated in this diagrammatic Figure 8. The switches 47 and 51 are ineffective, however, when the master switch A is closed because the master switch turns on all of the lights such as 45 and 50 or the electric devices in all of the circuits when it is closed.

The operation of the device is as follows:

To set the device in the dotted line position shown in Figure 2 with the circuits open, the handle 14 is manually moved to the dotted line position shown in Figure 2, which straightens the toggle joint composed of the links 22 and 23 to a locking position. As the handle 14 is moved counterclockwise from the solid to the dotted line position of Figure 2, the yoke 21 will move simultaneously therewith and will move the arms 17 and 18 and their rollers 19 and 20 to the dotted line positions of Figure 2. Some clearance is provided between the edge 14a of the handle and the transverse portion 16 of the plate latch so that the rollers 19 and 20 will be well clear of the plate 4 before the plate latch is tripped.

The handle 14 in its movement from the solid to the dotted line position of Figure 2, engages with its square lower edge 14a, the transverse portion 16 of the latch B. Further movement of the handle toward the dotted line position of Figure 2 after engagement of the portion 16 by the edge 14a rotates the latch B counter-clockwise, bringing the rounded lower corners of the sides 15 of the latch B into engagement with the plate 4. After the latch B has been rotated counter-clockwise in this manner sufficiently to bring the portions of the sides 15 which are in engagement with the plate 4 to the right of the pivot 13, it will have passed beyond dead center and will release the plate 4. Upon thus being released the springs 8 will suddenly force the plate 4 upwardly, separating the contact plates 3 from the contact springs 2.

Figure 3:
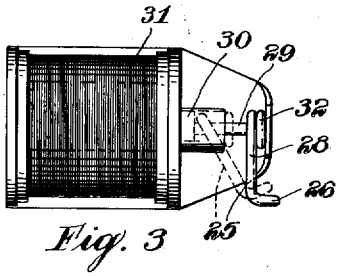
Figure 3 is a view in elevation of the releasing mechanism.
Figure 4:
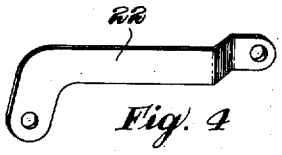
Figure 4 is a view in perspective of a locking element.

Upon closing the switch operating circuit through the solenoid 31, the core thereof is drawn inwardly, drawing the release lever 25 to the dotted line position shown in Figure 3, and, by means of the offset crank portion 26 thereof, raising the toggle joint, composed of the links 22 and 23, upwardly beyond a dead center position. The spring 24 then suddenly draws the lever arm 14 to the solid line position shown in Figure 2, moving the yoke 21 to the right and rotating the lever arms 17 and 18 clockwise to the solid line position shown in Figure 2. The rollers 19 and 20 during this operation force the sliding plate 4 downwardly to bring the contact plates 3 on the lower face thereof into engagement with the spring contact arms 2. This lowering of the plate 4 permits the pivotally mounted plate latch B to drop by gravity downwardly into the vertical or latching position shown in solid lines in Figure 2 and straightens the toggle joint composed of the members 22 and 23 to its locking position.

The device is intended primarily for use in buildings, where it is desired to provide a master control A for illuminating all of the lights therein. Each of the lights or circuits are independently controlled ordinarily by the switches 47 and 51 when the contacts of the master control switch A are open. This master switch A may be operated from any of a number of points, either within or without the building, by placing the switches 37 at the points where they are desired to control the operation of the switch A as illustrated diagrammatically in the circuits in Figure 8.

After the master switch has been actuated by an operation of the solenoid, it must be manually restored to the dotted line position of Figure 2 before the individual control of the lights by the switches 47 and 51 or similar switches is again possible.

Thus, each time the master switch A has been actuated by any one of the control switches 37, it must be reset by hand before the switches 47 and 51 are effective.

The switches 37 may also be incorporated in a burglar alarm mechanism so that upon operating the alarm the lights in the building will be illuminated simultaneously with the operation of the alarm mechanism.

We claim:

1. A switch mechanism, comprising a base, a plurality of switch contacts mounted thereon, a slidably mounted plate having a plurality of contacts thereon to register with said switch contacts, a frame mounted above said plate, a pair of bell crank levers mounted on said frame to pivot thereon, a link connecting said bell crank levers, a roller mounted in an end of each of said bell crank levers to roll upon the upper surface of said plate, a handle lever mounted on said frame and connected to said link to operate said levers, a latch member pivotally connected to said bell crank lever and having a transverse portion to engage said lever on an operation thereof to remove said latch member from engagement with said plate, a spring connected to said operating handle to normally draw said operating handle to rotate said bell crank levers and depress said plate, a toggle joint connecting said lever to said frame, an eccentric member mounted beneath said toggle joint to break said toggle joint upon an operation of said eccentric member, and electromagnetic means connected to said eccentric member to rotate said eccentric member and break said toggle joint to release said handle lever for operation by energization of said electromagnetic means.

2. A switch mechanism comprising a base, a plurality of contact members mounted thereon, a movable plate of insulative material mounted above said contact members, a plurality of contact points mounted on said insulative plate to engage said contact members, a spring mounted to normally hold said insulative plate in a raised position clear of said contact members, a movable frame mounted above said plate, a handle lever connected to said movable frame to operate said frame and move said insulative plate into engagement with said contact members, a spring mounted to normally hold said lever in an operated position to depress said insulative plate, means mounted to lock said handle lever in an unoperated position to permit said insulative plate to be raised clear of said contact points by said spring acting on said insulative plate, and electrically actuated trigger means to release said locking means to permit said operating handle spring to draw said operating handle to an operated position upon energization of said electrically actuated trigger means.

3. A switch mechanism including, a base, a plurality of switch contacts thereupon, a plate parallel to said base, a series of contacts on said plate to register with the contacts on said base, means for slidably mounting said plate for movement in a direction normal to said base, spring means for holding said plate with the contacts thereon in engagement with the contacts on said base, trigger means for holding said plate with the contacts thereon spaced from the contacts on said base and means for releasing said trigger.

4. A switch mechanism including, a base and a plate bearing complementary switch contacts, means for mounting said plate slidable into and out of engagement with the contacts on said base, spring means spacing said plate and base apart, a pivoted lever for sliding said plate, a spring secured to said lever capable of causing said lever to slide said plate into engaging position against the tension of said first named spring means, and a trigger for holding said lever pivoted to space said plate and base apart.

5. A switch mechanism including, a base plate and a plate bearing complementary switch contacts, spring means for forcing said base and plate apart to space said contacts, a second spring means for forcing said plates together to cause engagement of said contacts, said last named spring means being more powerful than said first named spring means, and means for rendering said first named spring inoperative to move said plate.

6. A switch mechanism including, a base, a plate, complementary contacts on said base and plate, spring means for forcing said plate away from said base to space said contacts apart, a frame mounted above said plate secured to said base, a lever pivoted to said frame, means operated by said lever to lower said plate, a spring secured to said lever urging said lever into position to depress said plate, and means for holding said lever in position wherein said plate is raised.

7. A switch mechanism including, a base, a plate, complementary contacts on said base and plate, spring means for urging said plate and base apart, a frame over said plate secured to said base, a lever pivoted to said frame, means operated by said lever for forcing said plate toward said base, a spring urging said lever to force said plate toward said base, a toggle joint connecting said lever to said frame for holding said last named spring inoperative, and means for breaking said toggle joint to cause said spring to pivot said lever.

8. A switch mechanism including, a base and plate having complementary contacts, spring means urging said plate from said base to space said contacts, a frame over said plate, a lever pivoted to said frame, means on said lever for forcing said plate toward said base to close said contacts, a spring secured to said lever for urging said lever to close said contacts, a toggle joint connecting said lever to said frame to hold said last named spring inoperative, an electromagnet on said frame, and means operated by said electromagnet for breaking said toggle joint to permit said last named spring to operate said lever.

CHARLES H. ELLIOTT.
HAROLD K. ELLIOTT.